Patented Aug. 18, 1953

2,649,355

UNITED STATES PATENT OFFICE 2,649,355

MANUFACTURE OF LEATHER

Theodore White and Jeremy Ralph Barnes Hastings, London, England, assignors to The Forestal Land, Timber and Railways Company Limited, London, England, a British company No Drawing. Application October 10, 1950, Serial No. 189,481. In Great Britain October 14, 1949

13 Claims. (Cl. 8—94.33)

This invention relates to the manufacture of leather.

Normally, hide is converted into leather by immersing it in an aqueous solution of polyphenolic vegetable tannins, of the sulphonated phenol-formaldehyde resins known as syntans, or of such other materials (e. g. chromium salts, formaldehyde, etc.) known to have a leathering action. The mechanism of tannage in these cases is still a matter of controversy but it has been generally accepted that leaving aside procedures such as formaldehyde tannage, the presence of phenolic hydroxyl groups is essential in an organic tanning agent. Several methods of tannage developed in recent years do not, however, conform to this concept—e. g. the conversion of hide to leather by depositing urea-formaldehyde or melamine-formaldehyde resins inside the hide structure (U. S. A. specifications Nos. 2,316,741 and 2,322,959); tannage with polyisocyanates (B. I. O. S. Final Report No. 762); and tannage by treatment with glyoxal followed by resin forming reagents such as urea (Winheim-Doherty process, Ind. Eng. Chem., Aug. 1948). In all these latter cases hide is converted to leather by treatment with a material of low molecular weight which either polymerizes in situ or is condensed in situ with other low molecular weight reagents to form a resin of from medium to high molecular weight. There is probably little, if any, direct combination between such resins and the hide substance, unlike the reactions between hide and vegetable tannins or syntans, and it seems possible that the ultimate leathering effect may be a physical rather than a chemical effect. None of these methods seems likely to be adopted on a scale approaching that of the conventional methods of tannage if only because of economic considerations. They have special applications, however, and are of interest if only because they establish the possibility of forming leather by in situ formation of a resin of high molecular weight in contrast to the conventional method of tanning with solutions containing a product which is already of high molecular weight.

It is well known that condensation products can be formed from aldehydes and ketones (cf. for example, White and Haward, J. C. S., (1943), 25; British specifications Nos. 551,219, 553,305, 560,669 and 19,087/09, and U. S. A. specification No. 2,378,573), and it is also known that the condensation products of aldehydes and ketones further condense in the presence of strong alkalis to form dark, often infusible resins of unknown structure (cf. for example, Ellis, "Chemistry of Synthetic Resins," 1935, vol. I, chapter 25, pages 540 to 563), and such resin formation is often a troublesome feature in the manufacture of many aldols and ketols.

It is an object of this invention to produce leather by treating hides with substantially non-resinous aldehyde-ketone condensation products followed by a treatment in an alkaline medium whereby the said condensation products are converted into resinous substances in situ in the hide.

It is a further object of this invention to produce leather by treating hides with solutions or dispersions of resinous aldehyde-ketone condensation products.

It is a further object of this invention to employ in the manufacture of leather condensation products of at least one aldehyde with at least one ketone.

It is a further and more particular object to employ in the manufacture of leather water-soluble condensation products of at least one aldehyde with at least one ketone and to convert such condensation products into a resinous condition by treatment with alkaline solutions.

According to the process of the present invention for the manufacture of leather, hides are impregnated with a substantially non-resinous condensation product of one or more aldehydes with one or more ketones, whereafter the impregnated hide is treated with an alkaline solution possessing a degree of alkalinity in the range of about pH 7 to about pH 12, preferably about pH 11, which is great enough to cause resinification of the condensation product but not so great as to cause substantially damage to the hide, until resinification of the said condensation product is effected.

Preferably the condensation products employed for the impregnation of the hides are water-soluble since this facilitates their application, but water-insoluble non-resinous condensation products may be used, or a proportion of pre-polymerised water-insoluble resin may be incorporated in the otherwise non-resinous impregnating medium.

Preferably also the condensation products are those obtained by the condensation of acetone and formaldehyde, methyl ethyl ketone and formaldehyde, methyl propyl ketone and formaldehyde, acetone and acetaldehyde, methyl ethyl ketone and acetaldehyde, or acetone and crotonaldehyde. Other similarly formed aldehyde-ketone condensation products can be used. The above-named condensation products may be mixed in any proportions before application to hide. Alternatively, mixed condensation products derived from aldehydes and ketones may be prepared by condensing two or more ketones with one or more aldehydes, or one or more ketones with two or more aldehydes.

According to a modification of the process of the invention, hides are impregnated with a solution or dispersion of a resinous condensation product of one or more aldehydes with one or more ketones.

If it is desired to form water-soluble condensation products, a large molecular excess of ketone over aldehyde should generally be employed although this is not always necessary.

The process of the invention is applicable to all types of hides but is particularly applicable to split hides, ox hides and sheepskins. If a limed hide is employed, such as limed ox hide of the type used for making sole leather, this should be de-limed before impregnation, for example with solutions containing 1% to 2% of ammonium chloride, or de-limed during impregnation by incorporating a de-liming agent (e. g. an acid or ammonium chloride) in the condensation product, since otherwise owing to the high pH value of the limed hide further condensation of the aldehydeketone condensation product with formation of insoluble resins on the surface of the hide takes place before the condensation product can penetrate the hide.

According to an embodiment of the invention the hide is immersed in an undiluted non-resinous condensation product of one or more aldehydes with one or more ketones or in a solution or dispersion thereof, preferably an aqueous solution or dispersion, until thorough impregnation of the hide has taken place, whereafter the impregnated hide is treated with an alkaline solution having a pH of at least 11 but not sufficiently high to cause substantial damage to the hide, until deposition of an insoluble resin is effected throughout the hide.

Whereas water-soluble condensation products may be applied in aqueous solutions in any concentration, water-insoluble products (including those consisting of or containing resinous components) may be applied either undiluted, or dissolved in a solvent (including water-soluble condensation products), or as an aqueous dispersion by employing any suitable dispersing agent. In all cases where non-resinous components are employed, a subsequent alkaline treatment is necessary in order to resinify and utilise these components, but where resinous components preponderate, it is possible to obtain a satisfactory result without subsequent alkaline treatment.

In general, it was found that satisfactory impregnation of the hide with the non-resinous aldehyde-ketone condensation product could be effected in three days at room temperature. Satisfactory impregnation can, however, be obtained under suitable conditions in much shorter periods, e. g. by drumming, or by the use of dispersing agents.

In the treatment with the alkaline solution it was found most satisfactory to use a 10% by weight solution of sodium carbonate having a pH of 11. It was found that sodium hydroxide solutions tended to give a brittle grain unless used in the presence of sodium carbonate, or in the presence of high concentrations of other, generally neutral, salts.

The following examples illustrate how the process of the invention may be carried into effect:

1. The initial condensation was carried out as described by White and Haward (loc. cit.) using 315 gms. of paraformaldehyde refluxed with 3 litres of acetone in the presence of 25 ml. of 1.6 N methyl alcoholic potash until a test with Tollens reagent was negative. Excess acetone was distilled off from the neutralised, filtered reaction product (A), giving an average recovery of 2,480 ml. of acetone and 735 gms. of condensation product. This latter, although initially completely soluble in water, condensed further extremely quickly when warmed with alkali solution at any pH $>$ 7 to form a highly coloured water-insoluble resin. Resinification occurred slowly with alkali at room temperature, the rate of resinification increasing markedly with pH.

A condensation similar to that above but with double the amount of alkali catalyst gave a viscous orange yellow condensation product (B) which was largely insoluble in water. (Yield = 745 gms.)

Both types of condensation product (A and B), (i. e. water-soluble and water-insoluble) were used for tannage. Split hide and sole hide de-limed with solutions containing 1 to 2% by weight of ammonium chloride were immersed in the condensation product at room temperature for 72 hours and then transferred to solutions containing 10% by weight of $Na_2CO_3$ (pH=11) for 24 hours. After washing, the leathers were dried out at room temperature, some with and some without oiling.

The unoiled treated split hide had a shrinkage temperature of 72° C. and, although it shrunk some 25% on boiling in water for 10 minutes, it dried out satisfactorily to a product retaining leather-like properties. The initial leather was rather harsher than a corresponding unoiled vegetable tanned split hide. The corresponding oiled leather was a reasonably pliable dressing leather of satisfactory fullness and would appear to be applicable in the production of upholstery leather, bag leather, etc. It was of a pale yellow colour, prolonged exposure to ultra-violet light having no darkening effect. There was little, if any, difference between the leathers from the water-soluble and water-insoluble condensation products.

The sole leather was extremely firm but was empty and light, the yield being of the order of 60%. It provided a good basis for subsequent filling and weighting with vegetable tans.

2. 300 gms. of paraformaldehyde, 2,500 ml. of methyl ethyl ketone and 10 ml. of 2 N methyl alcoholic potash were refluxed until the Tollens test was negative. The neutralised filtered product had the excess methyl ethyl ketone removed by distillation giving 1,850 ml. of ketone and 810 gms. of condensation product. This latter resinified in the same manner as the acetone-formaldehyde condensation product with alkali giving lighter coloured liquid resins, the reaction rate being somewhat slower.

Split hide and de-limed ox hide were tanned as described in Example 1 with this condensation product by immersing for 72 hours, and then resinifying in situ with solutions containing 10% by weight of $Na_2CO_3$; 10% by weight of $Na_2CO_3$ + 1% by weight of NaOH (pH approximately 12); and 2% by weight of NaOH, this latter giving an unsatisfactory horny product owing to the high pH and low salt content. Again the leathers were dried out with and without oiling, giving products virtually identical with those produced from the acetone-formaldehyde condensation product of Example 1, although with a rather lower shrinkage temperature of 65° C.

3. 30 gms. of paraformaldehyde, 344 gms. of methyl propyl ketone were condensed in the presence of 3 ml. of 2 N methyl alcoholic potash as in Example 1, ultimately yielding 90 gms. of condensation product which gave a yellow water-insoluble liquid resin on treating with alkali.

Split hide was immersed in a 60% by weight aqueous solution of the condensation product for 3 days at room temperature, subsequent treatment with a solution containing 10% by weight of $Na_2CO_3$ for 24 hours at room temperature or with a solution containing 10% by weight of $Na_2CO_3 + 1\%$ by weight of NaOH giving respectively a pale cream leather of shrinkage temperature of 65° C. and a cream leather of shrinkage temperature of 64° C. Both were full and supple in the oiled condition.

4. 500 gms. of acetone and 3 ml. of 2 N methyl alcoholic potash were cooled in an ice bath and 100 gms. of acetaldehyde added with stirring during 15 minutes, the reaction pH being 9. The mixture was left overnight at room temperature, neutralised with 2 N HCl in acetone, filtered and excess acetone removed by distillation. The yield of condensation product was 175 gms.

A corresponding experiment with 25 ml. of 2 N methyl alcoholic KOH was stirred for 15 minutes only and the condensation product isolated as above. The yield was 165 gms. The final product in each case was soluble in water and resinified readily on warming with aqueous alkali to give a red water-insoluble liquid resin.

Split hide was tanned by 72 hours' immersion in this condensation product, followed by 24 hours' immersion in a solution containing 10% by weight of $Na_2CO_3$. The dried, unoiled leather was soft and supple with a "kind" feel and a relatively smooth grain and was definitely superior to the products previously described, being almost comparable with the oiled, finished specimens from the acetone or methyl ethyl ketone-formaldehyde condensation products of Examples 1 and 2. A similar result was obtained by substituting for the initial condensation product a 10% aqueous solution of this latter at a pH of 3 and then resinifying as usual with a solution containing 10% by weight of $Na_2CO_3$.

5. 100 gms. of acetaldehyde were added, with stirring, during 15 minutes to 750 gms. of methyl ethyl ketone plus 25 ml. of 2 N methyl alcoholic KOH cooled in ice. After a further 15 minutes, the mixture was neutralised with 2 N HCl in methyl ethyl ketone, filtered and excess ketone distilled off under reduced pressure. The recovery of methyl ethyl ketone=565 ml. The yield of condensation product =270 gms. This latter formed pale yellow water-insoluble liquid resins on warming with aqueous alkali.

Split hide was immersed in the condensation product for 72 hours and then treated with solutions containing 10% by weight of $Na_2CO_3$ or 10% by weight of $Na_2CO_3 + 1\%$ by weight of NaOH for 24 hours. The former gave a pale yellow, soft, full leather and the latter a stiffer, rather fuller leather of shrinkage temperature 60–62° C.

6. 50 gms. of crotonaldehyde were added, with stirring, during 10 minutes to 315 ml. of acetone and 10 ml. of 2 N methyl alcoholic KOH kept below 5° C. in an ice bath. After 5 minutes' further stirring the reaction mixture was neutralised by passing in $CO_2$, then filtered and the excess acetone distilled off, leaving 80 gms. of condensation product. This latter was largely soluble in water and resinified readily to a water-insoluble red liquid resin on warming with alkali.

It should be noted that owing to the ease of resinification of crotonaldehyde under alkaline conditions it was necessary to carry out the condensation below 5° C. in the presence of a large excess of acetone.

Split hide immersed for 72 hours in the condensation product, followed by 24 hours in solutions containing 10% by weight of $Na_2CO_3$ gave by far the best leather of any of the examples in that it dried out, without oiling, to a very supple, soft leather with a smooth grain. The leather appeared to be very similar to a good vegetable tanned split hide and had a shrinkage temperature of 76° C.

7. 55 gms. of acetaldehyde together with 70 gms. of crotonaldehyde were added, with stirring, during 30 minutes to 464 gms. of acetone and 20 ml. of 2 N methyl alcoholic KOH kept below 5° C. in an ice bath. After 15 minutes' further stirring, the reaction mixture was neutralised by passing in $CO_2$, then filtered and the excess acetone distilled off, leaving 178 gms. of condensation product. This latter was largely soluble in water, and orange in colour.

Split hide was immersed in a 70% w./w. aqueous solution of condensation product for 72 hours, followed by a 10% aqueous solution of $Na_2CO_3$ for 24 hours. The hide was washed for 15 minutes, lightly oiled, and dried. The shrinkage temperature was 75° C. The leather was fawn-coloured, full and soft.

8. 70 gms. of crotonaldehyde together with 162 gms. of 37% aqueous formaldehyde were added, with stirring, during 30 minutes to 116 gms. of acetone and 2 gms. of $Na_2CO_3$ cooled in an ice bath to below 10° C. Towards the end of this period the pH was maintained at 10.5 to 11 by the gradual addition of 5 ml. of 20% NaOH. The temperature was then raised during 15 minutes to 35° C., and maintained at 35° to 40° C. with some cooling for half an hour. After standing overnight the mixture was warmed at 40° C. for 3 hours, the pH being maintained at 10.5 to 11 by the gradual addition of 3 ml. of 20% NaOH. The mixture was neutralised with 5 ml. of 10% $H_2SO_4$ and filtered, yielding 360 gms. of an aqueous solution of condensation product. This was completely miscible in water, and yellow in colour, and had only a slight reaction with Tollens reagent.

Split hide was immersed in condensation product for 72 hours, followed by a 10% aqueous solution of $Na_2CO_3$ for 24 hours. The hide was washed for 15 minutes, lightly oiled, and dried. The shrinkage temperature was 80° C. The leather was cream in colour, full and soft.

9. 44 gms. of acetaldehyde together with 162 gms. of 37% aqueous formaldehyde were added, with stirring, during 30 minutes to 58 gms. of acetone together with 72 gms. of methyl ethyl ketone and 2 gms. of $Na_2CO_3$ kept below 10° C. in an ice bath. Towards the end of this period the pH was maintained at 10.5 to 11 by the gradual addition of 5 ml. of 20% NaOH. The temperature was then raised during 15 minutes to 35° C. and maintained at about 40° C. for a further 1½ hours, the pH being maintained by the gradual addition of a further 3 ml. of 20% NaOH.

The mixture was then neutralised with 6 ml. of 10% $H_2SO_4$, yielding 354 gms. of an aqueous solution of condensation product. This was completely miscible with water, pale yellow in colour, and had only a slight reaction with Tollens reagent.

Split hide was immersed in condensation product for 72 hours, followed by a 10% aqueous solution of $Na_2CO_3$ for 24 hours. The hide was washed for 15 minutes, lightly oiled, and dried. The shrinkage temperature was 81° C. The leather was pale cream in colour and soft.

10. 22 gms. of acetaldehyde together with 35 gms. of crotonaldehyde and 162 gms. of 37% aqueous formaldehyde were added, with stirring, during 30 minutes to 58 gms. of acetone together with 72 gms. of methyl ethyl ketone and 2 gms. of $Na_2CO_3$ kept below 10° C. in an ice bath. Towards the end of this period the pH was maintained at 10.5 to 11 by the gradual addition of 5 ml. of 20% NaOH. The temperature was then raised during 15 minutes to 35° C. and maintained at 35° to 40° C. with some cooling for 1 hour, the pH being maintained by the gradual addition of a further 5 ml. of 20% NaOH. The mixture was allowed to stand overnight, and then neutralised with 5 ml. of 10% $H_2SO_4$, yielding 367 gms. of an aqueous solution of condensation product. This was completely miscible with water, pale yellow in colour and had only a slight reaction with Tollens reagent.

Split hide was immersed in condensation product for 72 hours, followed by a 10% aqueous solution of $Na_2CO_3$ for 24 hours. The hide was washed for 15 minutes, lightly oiled and dried. The shrinkage temperature was 80° C. The leather was cream in colour, and soft.

11. 243 gms. of 37% aqueous formaldehyde were added, with stirring, during 30 minutes to 58 gms. of acetone together with 72 gms. of methyl ethyl ketone and 2 gms. of $Na_2CO_3$, the temperature being maintained at 35° to 40° C. for 3 hours. The mixture was left overnight, and then maintained for a further 5 hours at about 40° C., the pH being maintained at 10.5 to 11 by the gradual addition of 3 ml. of 20% NaOH. The mixture was neutralised with 6 ml. of 10% $H_2SO_4$, yielding 380 gms. of an aqueous solution of condensation product. This was completely miscible with water, pale yellow in colour, and had only a slight reaction with Tollens reagent.

Split hide was immersed in condensation product for 72 hours, followed by a 10% aqueous solution of $Na_2CO_3$ for 24 hours. The shrinkage temperature was 74° C. The leather was very pale in colour, and fairly firm in texture, but supple.

12. A water-insoluble acetone-formaldehyde resin was prepared as follows:

Into 348 gms. (6 gm.-mols.) of acetone together with 20 gms. of $Na_2CO_3$ were run, with stirring, over 1 hour 973 gms. (12 gm.-mols.) of 37% aqueous formaldehyde, the temperature being restricted to 60° C. with some cooling. The temperature was maintained at 50° to 60° C. for a further 1 hour, and then a further 20 gms. of $Na_2CO_3$ added. The condensate was heated on a steam bath for 30 minutes in order to cause polymerisation to resin, and unreacted acetone removed simultaneously by distillation (120 gms. of aqueous solution containing approximately 75% acetone). The precipitated resin was separated, crushed, suspended in water, the suspension neutralised with dilute HCl, and the resin filtered off, washed with water, and dried over phosphorus pentoxide, yielding 310 gms. of dry resin. This resin was used as a component in several subsequent tanning trials.

In the following tanning trials, an acetone-formaldehyde condensate was employed as prepared in Example 1, a methyl ethyl ketone-formaldehyde condensate as prepared in Example 2, an acetone-acetaldehyde condensate as prepared in Example 4, and an acetone-crotonaldehyde condensate prepared in a similar manner to Example 6, but in this last instance with the condensation conditions increased in severity to give a product that was largely insoluble in water:

(a) Split hide was immersed for 24 hours in 75% aqueous ethyl alcohol, followed by 48 hours in a solution of 40 gms. of solid acetone-formaldehyde resin in 90 gms. of ethyl alcohol and 30 gms. of water. The hide was transferred to 10% $Na_2CO_3$ for 24 hours, washed for 15 minutes, lightly oiled, and dried. The shrinkage temperature was 69° C. The leather was cream in colour, full and stiff, but fairly supple when worked.

(b) Split hide was impregnated with solid acetone-formaldehyde resin as in (a), and then soaked in water for 5 hours, lightly oiled, and dried.

The shrinkage temperature was 66° C. The leather resembled that in (a).

(c) Split hide was immersed in undiluted acetone-acetaldehyde condensate for 24 hours, followed by a 25% w./w. solution of solid acetone-formaldehyde resin in acetone-acetaldehyde condensate for 48 hours, followed by 10% $Na_2CO_3$ for 24 hours. The hide was washed for 15 minutes, lightly oiled, and dried.

The shrinkage temperature was 76° C. The leather was pale cream in colour, full and soft.

(d) Split hide was immersed in undiluted methyl ethyl ketone-formaldehyde condensate for 24 hours, followed by a 25% w./w. solution of solid acetone-formaldehyde resin in methyl ethyl ketone-formaldehyde condensate for 48 hours, followed by 10% $Na_2CO_3$ for 24 hours. The hide was washed for 15 minutes, lightly oiled, and dried. The shrinkage temperature was 78° C. The leather was very pale in colour, full and fairly firm, but supple when worked.

(e) Split hide was immersed in undiluted acetone-formaldehyde condensate for 24 hours, followed by a 25% w./w. solution of acetone-crotonaldehyde condensate in acetone-formaldehyde condensate for 48 hours, followed by 10% $Na_2CO_3$ for 24 hours. The hide was washed for 15 minutes, lightly oiled, and dried.

The shrinkage temperature was 78° C. The leather was pale cream in colour, full and soft.

(f) Split hide was immersed in a mixture of equal parts of undiluted acetone-formaldehyde and methyl ethyl ketone-formaldehyde condensates for 24 hours, followed by a mixture of equal parts of solid acetone-formaldehyde resin, acetone-crotonaldehyde, acetone-formaldehyde, and methyl ethyl ketone-formaldehyde condensates for 48 hours, followed by 10% $Na_2CO_3$ for 24 hours. The hide was washed for 15 minutes, lightly oiled, and dried.

The shrinkage temperature was 77° C. The leather was cream in colour, full and firm, but supple when worked.

(g) Split hide was drummed for 48 hours in a dispersion of 40 gms. of acetone-formaldehyde condensate in 155 gms. of water together with 5 gms. of sulphonated castor oil. The hide was transferred to 10% $Na_2CO_3$ for 24 hours, washed for 15 minutes, lightly oiled, and dried.

The shrinkage temperature was 76° C. The leather was pale fawn in colour, and soft.

In the appended claims the term "solution" includes "dispersion."

What we claim is:

1. A process for the manufacture of leather which comprises impregnating hides with a condensation product of at least one aldehyde of the formula RCHO, wherein R is selected from the group consisting of hydrogen and saturated and unsaturated alkyl groups having from one to four carbon atoms, with at least one ketone of the formula R'R"CO, wherein each of the substituents R' and R" is an alkyl group, wherein R' plus R" is not more than four carbon atoms, and treating the impregnated hides with an inorganic alkaline solution having a pH between 7 and about 12.

2. A process for the manufacture of leather in accordance with claim 1 in which the hides are impregnated with a resinous condensation product in solution.

3. In the process in accordance with claim 1 the steps of impregnating with an unresinified condensation product and treating with the inorganic alkaline solution until resinification of the condensation product is effected.

4. A process for the manufacture of leather in accordance with claim 3 in which the aldehyde is formaldehyde.

5. A process for the manufacture of leather in accordance with claim 3 in which the aldehyde is acetaldehyde.

6. A process for the manufacture of leather in accordance with claim 3 in which the aldehyde is crotonaldehyde.

7. A process for the manufacture of leather in accordance with claim 3 in which the ketone is acetone.

8. A process for the manufacture of leather in accordance with claim 3 in which the ketone is methyl ethyl ketone.

9. A process for the manufacture of leather in accordance with claim 3 in which the ketone is methyl propyl ketone.

10. A process for the manufacture of leather in accordance with claim 3 in which the aldehyde is formaldehyde and the ketone is acetone.

11. A process for the manufacture of leather in accordance with claim 3 in which the alkaline solution is an aqueous sodium carbonate solution.

12. A process for the manufacture of leather in accordance with claim 3 in which the substantially unresinified condensation product is water-soluble.

13. In the process of claim 3, the steps of impregnating with an unresinified condensation product and then treating with an inorganic alkaline solution having a pH at least about 11 but not over 12 until resinification of the condensation product is effected.

THEODORE WHITE.
JEREMY RALPH BARNES HASTINGS.

References Cited in the file of this patent

UNITED STATES PATENTS

| Number | Name | Date |
|---|---|---|
| 1,514,508 | Ellis | Nov. 4, 1924 |
| 1,539,517 | Schmidt | May 26, 1925 |
| 2,045,049 | Noerr et al. | June 23, 1936 |
| 2,159,875 | Zwicky et al. | May 23, 1939 |
| 2,246,070 | Schlack | June 17, 1941 |
| 2,257,239 | Krzikalla | Sept. 30, 1941 |

OTHER REFERENCES

J. I. S. L. T. C. article by Gustavson, pages 377 to 389, November 1940.

"Progress in Leather Science 1920–1945," published by Br. Lea. Man. Research Assoc., London, England, 1948, pages 494 and 495.